United States Patent [19]

Cain et al.

[11] Patent Number: 4,795,331

[45] Date of Patent: Jan. 3, 1989

[54] MOLD VENT PLUG

[75] Inventors: Don A. Cain, Gadsden, Ala.; Michael F. Dewaele, Parma, Ohio

[73] Assignee: The Goodyear Tire & Rubber Company, Akron, Ohio

[21] Appl. No.: 104,916

[22] Filed: Oct. 6, 1987

Related U.S. Application Data

[63] Continuation-in-part of Ser. No. 907,334, Sep. 15, 1986, abandoned.

[51] Int. Cl.<sup>4</sup> ......................... B29C 35/00; B29C 39/26
[52] U.S. Cl. ...................................... 425/28.1; 425/812
[58] Field of Search .................... 425/28 R, 34 R, 812

[56] References Cited

U.S. PATENT DOCUMENTS

| | | | |
|---|---|---|---|
| 3,110,339 | 11/1963 | Fickel | 425/501 |
| 3,377,662 | 4/1968 | Fukushima | 425/28.1 |
| 3,885,618 | 5/1975 | Hodler | 425/812 |
| 3,941,355 | 3/1976 | Simpson | 366/341 |
| 3,989,430 | 11/1976 | Dailey | 425/812 |
| 4,305,672 | 12/1981 | Adams | 366/336 |
| 4,436,497 | 3/1984 | Dahl et al. | 425/812 |
| 4,436,497 | 3/1984 | Dahl et al. | 425/28 R |

FOREIGN PATENT DOCUMENTS

| | | | |
|---|---|---|---|
| 776569 | 1/1968 | Canada . | |
| 41-1956 | 5/1964 | Japan | 425/812 |
| 45-5896 | 4/1965 | Japan | 425/812 |
| 1016124 | 2/1964 | United Kingdom . | |
| 1117281 | 4/1966 | United Kingdom | 425/812 |
| 1060334 | 3/1967 | United Kingdom | 425/812 |

Primary Examiner—Willard Hoag
Attorney, Agent, or Firm—T. P. Lewandowski

[57] ABSTRACT

A vent plug for a mold having a head, neck and collar where the collar seats the plug in a bore in the mold, and the head forms an annulus with the bore for passage of air to the neck and past the collar to a cross vent and drilled hole providing a labyrinth to vent the mold. The bore may be counterbored to receive the head.

16 Claims, 2 Drawing Sheets

MOLD VENT PLUG

This is a continuation-in-part, of application Ser. No. 907,334 filed on Sept. 15, 1986 and now abandoned.

This invention relates to mold vents in molds for forming elastomeric articles and the like and more particularly to mold vent plugs with small vent openings often referred to as microvents.

It is desirable to prevent air from being trapped between an elastomeric article and the molding surface of a mold, such that the surface of the article may contact the molding surface uninterruptedly. If air should become trapped between the surface of the article and the molding surface, a blemish, sometimes referred to as a light spot, may result in the finished article. This is true for elastomeric molded articles such as tires and the like made of rubber or other elastomeric material.

It is old to provide bores through a mold to act as a means for venting air from between an article and the molding surface of the mold. Later, these bores were fitted with vent plugs having heads forming annuluses with the bores, and bodies press fit into the bores with grooves in the bodies to vent to the bores. Plugs were even introduced with serrations on the head to engage the bore and placed in sleeves and/or made up of multi pieces of wire. For reasons of plugging and difficulty of insertion plus other unknown reasons, these plugs were never used. More recently vent plugs have been introduced having small bores therein in comparison to the bores that could be drilled through the mold itself to permit air to be vented from the mold surface while at the same time preventing elastomer from entering the small hole in the plug vent. When the small holes in the vent plugs were made large enough to assure venting of all the air from the surface of the mold there was a tendency for elastomer from the molded product to enter even this small hole. If the projections formed by the flow of elastomer material into the small holes were allowed to break away from the molded article upon its removal from the mold the projections remain in the holes and thereby made the plug vents nonfunctional for the next article to be molded. Where the holes were too small to be drilled the plugs would have to be removed and replaced.

Attempts were made to assure that the projections would be pulled from the small holes in the plugged vents by making the opening in the vent plug at the molding surface slightly enlarged so that the base of the projection of elastomer is stronger and less likely to break when the article is removed from the mold.

Further the plugs themselves were press fit into the bores in the mold and had diameters that interfered with the walls of the bores through the mold along substantially their entire length but were subsequently improved with an interference fit of no more than 50% of the overall length of the plug being used to facilitate removal and replacement of the plugged vent in the mold.

The present invention overcomes the above disadvantages by providing a vent plug with the head forming an annular gap between the head and the bore in the mold into which the plug is inserted. The head portion is located at the molding surface of the mold to present a ring opening having the equivalent area to that of a hole in the microvent whereby the gap between the head and the mold can be very small in comparison to the diameter of the microvent hole dependent upon the diameter of the head and bore in which the head is located. The larger the head diameter the smaller can be the gap between the head and the mold with the equivalent area to that of the microvent hole still being maintained as long as the gap is big enough to vent the required amount of air. The substantial reduction in size of the gap compared to the diameter of the microvent hole prevents any elastomer from entering the gap. Thus, the gap is not subject to plugging and there is no projection from the molded article that necessitates subsequent trimming as is the case where elastomer enters the hole of the microvent and then is subsequently pulled out of the hole upon curing of the elastomer article.

Another advantage to the vent plug is the engaging surface of the plug to the mold bore can be made independent of the plug head with a surface size sufficient only for proper location and fixing of the plug in the bore. This makes the plug easier to insert in the bore and also easier to remove from the bore. Further, another advantage is with the head being independent from the engaging surface only that depth of the head necessary to provide, together with the remaining venting passages, the labyrinth for sealing out the flow of elastomer may be provided. As a result the flow of air or fluid and the desirable venting of the mold can be enhanced by providing the proper thickness of the plug head in combination with properly sized venting passages.

Finally, the vent plug body can be reduced in diameter to provide a guide for proper insertion of the plug into the mold bore and need not have the interference fit of previous microvents except on its head portion and/or collar.

A mold according to the present invention defines a cavity having walls surrounding the cavity and venting apparatus in a bore in the walls between the cavity and the outside atmosphere. The venting apparatus includes a vent plug with a head of lateral areas less than the area of the bore forming the opening to receive the plug which plug is located adjacent the cavity. A further reduced area portion forms an annulus adjacent the head and opposite of the cavity. An expanded area greater than that of the head is located adjacent the reduced area and opposite the head thereby forming a collar for engaging the bore. A body portion guides the plug into the bore, and means providing a labyrinth together with a gap formed between the head and the bore for passing fluid past the collar from the mold cavity completes the venting apparatus.

The above advantages of the invention will become readily apparent to one skilled in the art from reading the following detailed description of an embodiment of the invention when considered in light of the accompanying drawings.

BRIEF DESCRIPTION OF THE DRAWINGS

FIGS. 3-6 are alternate embodiments of vent plugs in accordance with the present invention wherein

Referring to FIG. 1 there is shown a fragment of a mold (10) for molding a tire at the molding surface (12) having a bore (14) therein with a counterbore (16) at the molding surface (12) thereof. A gap (18) is formed between the counterbore (16) and a vent plug (20) inserted in the bore (14) of the mold. While the vent plug illustrated was used for a tire mold, the plug and similar embodiments thereof can be used for other molded elastomers as well.

Figure 1:
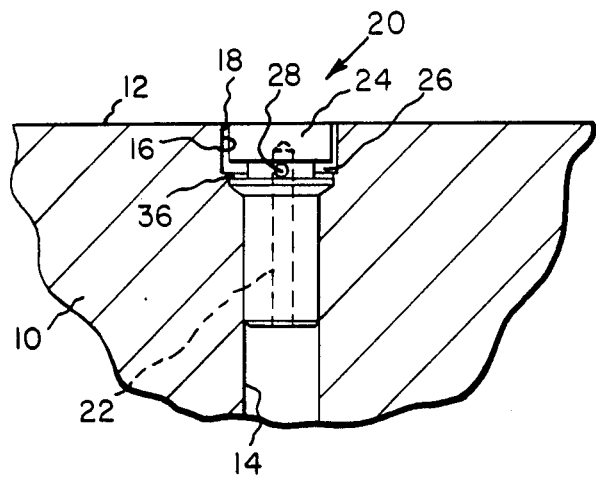
FIG. 1 is a fragmentary cross sectional view of a mold bore with a vent plug according to the present invention inserted therein.

The plug (20) illustrated replaced a microvent plug with a 0.023" diameter hole passing all the way through the longitudinal axis of the plug. As illustrated, the plug (20) has the 0.023" diameter longitudinal axis hole (22) plugged at the molding surface end of the plug (20). The hole (22) ends in the head portion (24) of the vent plug (20) which had an enlarged diameter head for press fitting into a straight bore in the mold. The straight bore in the mold was counterbored as at (16) to form the gap (18) between the mold (10) and the plug (20). The gap (18) was sized to give at least the equivalent area of the previous microvent hole which resulted in the gap (18) being much smaller across than the diameter of the previous microvent hole. The gap (18) allows airflow there through to a groove (26) in the form of an annulus in the embodiment disclosed in FIG. 1 which communicates with a cross vent hole (28) which in turn permits the air to flow to the vent hole (22) and out through the bore (14) in the mold.

Use of the plug (20) has resulted in proper venting of the air from tire molds while preventing any rubber flow from entering the gap (18) resulting in the elimination of any projections on the tire while at the same time avoiding the necessity of cleaning any microvent plugs.

It should be recognized that the size of the gap (18) for maintaining an equivalent area to that of the vent hole (22) is further a function of the diameter of the head (24) of the plug (20) as well as the accompanying counterbore (16) of the mold (10). For a given plug and vent hole diameter the greater the diameter of the head of the plug, the smaller can be the gap of the annulus between the plug and the mold counterbore while still maintaining an equivalency of area for purposes of venting the air. The gap between a vent plug and the bore and a mold for a plug of the type disclosed herein should be between the maximum gap allowable to exclude the compound of the article being molded from entering the gap, and the minimum gap allowable to permit the required air flow to vent the mold (10).

Testing results given below will show that as the vent plug 20 and bore 14 relationship was refined it could be seen that the labyrinth for fluid flow between them was affected by many parameters but with some being more significant than others. The data show that a reduction in the length of the vent plug 20 head length D consistently increased air flow through the bore 14 with the vent plug 20 in it, in some cases more than doubling the flow when compared to otherwise identical vents, undoubtedly due to the reduced friction loss as a result of shortening the highest velocity flow path along the labyrinth path. Addition of a 25° expansion diffuser substantially increased flow when compared to vent embodiments without a diffuser. This result could be due to a reduction in turbulence as well as friction from the fluid flow.

Figure 2:
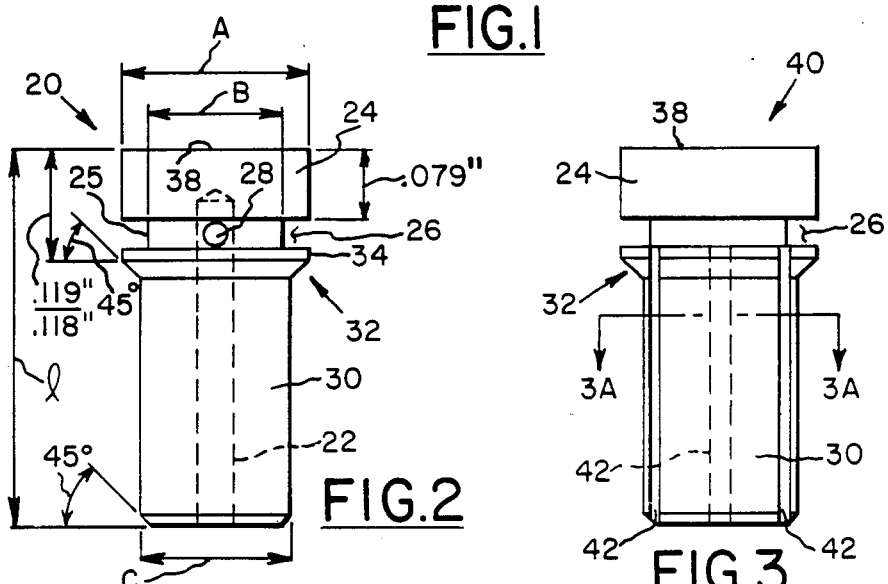
FIG. 2 is an enlarged view of the vent plug in FIG. 1.

FIG. 2 of the drawings illustrates the plug (20) in an enlarged view giving the dimensions of the plug (20) and mold bores (14 and 16) in conjunction with Table I which resulted in gaps (18) which were successful in preventing flow of rubber into the gap (18) when molding tires.

TABLE I (Dimensions in Inches)

| ITEM | PLUG LENGTH L | PLUG DIAMETERS | | | MOLD BORES | | GAP |
|---|---|---|---|---|---|---|---|
| | | A | B | C | #14 | #16 | #18 |
| 1. | .551/.549 | .126 | .070 | .119 | .098 (#40 Drill) | .1285 (#30 Drill) | .00125 |
| 2. | .3125/.3123 | .126 | .070 | .119 | .116 (#32 Drill) | .1285 (#30 Drill) | .00125 |
| 3. | .3125/.3123 | .1335 | .070 | .127 | .1215 (3.1 mm Drill) | .126 (#29 Drill) | .00125 |
| 4. | .540/.560 | .125 | .070 | .119 | .1285 (#30 Drill) | — | .0018 |
| 5. | .540/.560 | .124 | .070 | .062 | .1285 (#30 Drill) | — | .0027 |
| 6. | .540/.560 | .1253/.1258 | .085 | .127/.128 | .1285 (#30 Drill) | — | .0015 |

TABLE II

| Vent No. | 1st Test Flow (CC/Min) | 2nd Test Flow (CC/Min) | Head Dim. D Inches | Radial Clearance 18 Inches |
|---|---|---|---|---|
| 1 | 100 | 200 | .015 | .0008 |
| *2 | | | | |
| 3 | 35 | 40 | .050 | .0008 |
| 4 | 10 | 45 | .079 | .0008 |
| 5 | 20 | 35 | .100 | .0008 |
| 6 | 400 | 500 | .015 | .0018 |
| 7 | 500 | 750 | .028 | .0018 |
| 8 | 200 | 325 | .050 | .0018 |
| 9 | 150 | 300 | .079 | .0018 |
| 10 | 200 | 200 | .100 | .0018 |
| 11 | 800 | 675 | .015 | .0027 |
| 12 | 600 | 600 | .028 | .0027 |
| 13 | 600 | 775 | .050 | .0027 |
| 14 | 475 | 600 | .079 | .0027 |
| 15 | 300 | 550 | .100 | .0027 |
| 16 | 600 | 800 | .015 | .0042 |
| 17 | 750 | 950 | .028 | .0042 |
| 18 | 60 | 200 | .050 | .0042 |
| 19 | 650 | 752 | .079 | .0042 |
| 20 | 600 | 700 | .100 | .0042 |
| *21 | | | | |
| 22 | 300 | 650 | .028 | .0008 |
| 23 | 1000 | 975 | .015 | .0018 |
| 24 | 500 | 625 | .028 | .0018 |
| 25 | 1300 | 2000 | .015 | .0027 |
| 26 | 850 | 1350 | .028 | .0027 |
| 27 | 2000+ | 2000+ | .015 | .0042 |
| 28 | 1000 | 1550 | .028 | .0042 |
| *29 | | | | |
| 30 | 40 | 100 | .079 | .0015 |
| 31 | 225 | 450 | .079 | .0020 |
| 32 | 80 | 100 | .047 | — |

*TEST NOT REPEATABLE

In FIG. 2, the vent plug (20) can be seen to have three major diameters A, B, and C and an overall length 1. The length and diameters for the actual vent plugs (20) used are given in items 1–3 of Table I above while items 4–6 give the dimensions for FIGS. 5, 6 and 7 respectively. The dimension A is the diameter of the head (24) of the vent plug (20) while dimension B is the diameter of the neck (25) formed by the groove (26) cut in the head (24) of the vent plug (20). Dimension C is the diameter of the body (30) of the vent plug (20).

The head for the vent plugs (20) of items 1–3 in Table I above had a depth of from 0.118" to 0.119" with an upper portion depth of about 0.079" (2 mm) as shown in FIG. 2 while the groove (26) was just big enough to accommodate drilling a 0.022" diameter cross vent hole (28). The cross vent hole (28) must be big enough to provide two holes which together equal or exceed the cross sectional area of the vent hole (22). Similarly, the open area entering into the groove (26) must equal or exceed the open area for the gap (18) between the plug head (24) and the mold counterbore (16) to insure adequate and free flow of air to vent the mold (10).

The lower portion (32) of the plug head (24) is chamfered at a 45° angle to meet the outer diameter of the body (30) to assure clearance for seating of a peripheral face (34) in a lower bore (36) in the mold of FIG. 1. With a 0.022" diameter cross vent and a 0.079" (2 mm) upper head portion depth, the collar depth is fixed. However, these depths for particular applications can vary to meet air flow and seating requirements within a range of 0.035" to 0.079". The lower bore (36) was made by a #32 drill for a diameter of 0.116" for items 1 and 2 of Table I while for item 3 the lower bore (36) was made with a ⅛" drill. Thus, in each instance it is a force or press fit for the peripheral surface (34) with the lower bore (36). The lower bore (36) like the bore (16) is a counterbore being drilled after the bore (14) but before counterbore (16).

Similarly, if the diameters C of items 1-3 of Table I are compared with the mold bores (14) for each of the items, it will be seen that the body (30) is a press fit in the bore (14) of the mold (10). To assist assembly of the vent plug (20) into the bore (14) of the mold (10) the vent plug (20) is chamfered at the bottom thereof at a 45° angle with a chamfer of 0.010" to 0.050".

Finally, in comparing the A diameters in Table I with the counterbore (16) it will be seen that the bore is such as to maintain the gap (18) defined in Table I at 0.00125".

The plugs defined by items 1-3 in Table I and illustrated in FIG. 2 were made of 3/16 stainless steel and were sintered plugs for use in aluminum molds. While the stainless steel plugs have the advantage of resistance to corrosion as does an aluminum mold, molds are made of steel and for such molds the plugs could be made of machine steel. Other materials could be used for the vent plugs where the materials were suitable to the alternate mold and/or product being molded.

The vent plug (20) is generally inserted into the bore (14) of the mold (10) so that the plug head (24) is generally flush with the molding surface (12). However, it is preferred to insert the vent plug (20) to a depth of 0.003" below the molding surface to assure avoidance of indentation of the surface of the molded article. While the plug head (24) of FIG. 2 has a face (38) on the top thereof which is flat, it can be appreciated that where the mold is contoured the face (38) can be contoured to match that of the mold (10).

Figure 3:
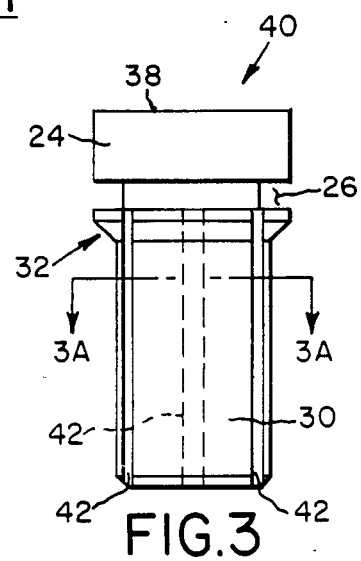
Figure 4:
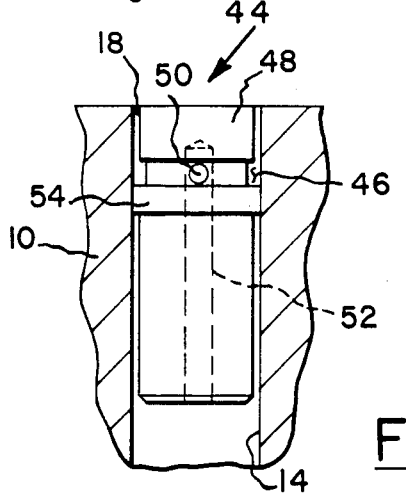
Figure 3A:
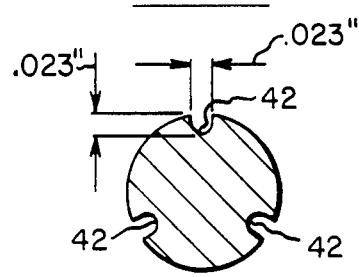
FIG. 3A is a cross sectional view taken along lines AA of FIG. 3.
Figure 6:
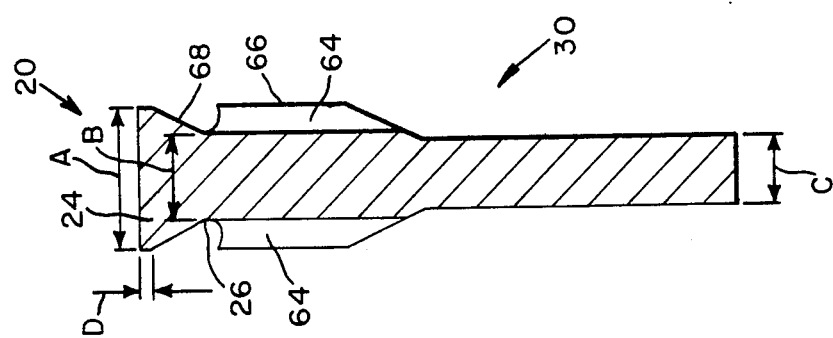
Figure 5:
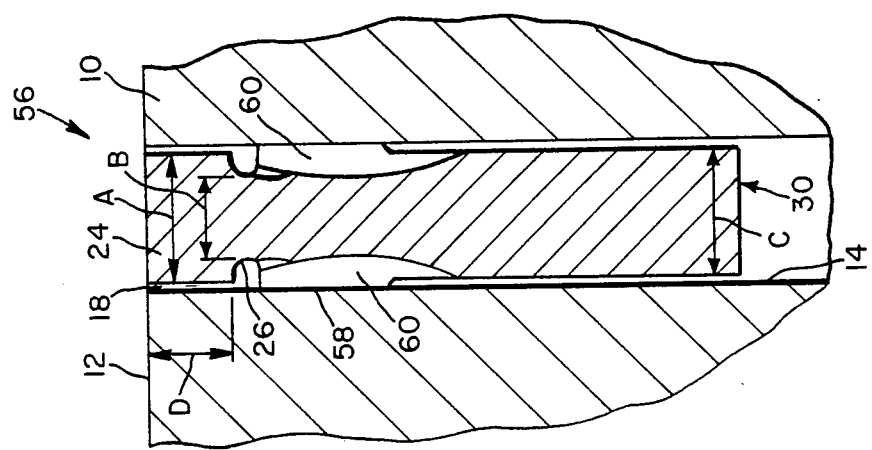

FIGS. 5 and 6 illustrate embodiments of the vent plug (20) further refining the configuration of FIG. 3 having the same head (24) and groove (26) therein in FIG. 5 and a modified head (24) in FIG. 6. Both embodiments have their dimensions given in Table I above. However, the body (30) of the vent plug (56) of FIG. 5 does not have flutes along its longitudinal axis but in place thereof has an extended collar (58) and grooves (60) extending over the length of the extended collar (58). In the embodiment illustrated the grooves (60) are 0.025" wide and 0.016" to 0.019" deep and two of them are required to give the necessary area for venting air from the mold (10). It will be appreciated that if the number of grooves were increased, the size and depth of the grooves could be decreased or vice versa. The extended collar has a length of 0.119" and the grooves (60) vent to the annulus between bore (14) and the body (30) which can be seen from Table I to be a larger annulus than the gap (18) because the diameter 'C' is always smaller than diameter 'A'. While particular grooves (60) are illustrated it can be appreciated that other shapes could be used where the configuration thereof would provide sufficient area to vent the mold (10).

In FIG. 6, a vent plug (62) illustrates further refinement of the vent plug (56) in FIG. 5 which are both adapted to a single bore (14) in the mold (10). The vent plug (62) has a head (24) for forming a gap (18) with the bore (14) in the mold (10) to permit passage of air to grooves (64) which communicate with an annulus formed by the bore (14) and body (30). The body (30) is greatly reduced in diameter over the body (30) of FIG. 5 to further enhance the flow of fluid. An extended collar (66) has a press fit with the bore (14) to thereby fixedly position the vent plug (44) within the mold (10) the same as the extended collar of FIG. 5.

Figure 7:
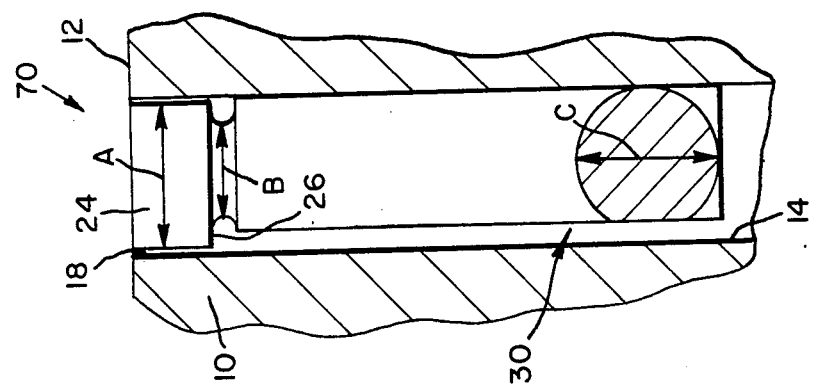
FIG. 7 is a prior art plug having a cross-section of its body portion illustrated thereon.

The head (24) has been modified with a 25° expansion diffusion contour (68) extending around the entire periphery of the head (24) so that the effective length of the head may be only 0.015". The contour (68) provides more laminar flow by eliminating turbulence as well as friction. The collar and groove sizes are the same as those in FIG. 5 except the groove width was increased to 0.050". Lastly, FIG. 7 is a prior art vent plug (70) previously found to work in a ¼" bore but surprisingly did not work when down sized to the ⅛" bore of all the other vent plugs illustrated herein. The larger bore was not useful in the molds for the other vent plugs being too large for the detailed design, and therefore the other vent plugs could not be increased to the ¼" size. In the embodiment of FIG. 7 the body (30) has a press fit in the bore with a flat on one side as illustrated by the cross section thereon to vent the groove (26). The remaining dimensions of the vent plug (70) are given by item 6 in Table I.

Table II, above, gives data on two tests run on the above vent plugs of FIGS. 5-7 wherein vent Nos. 1-20, 30 and 31 were of the configuration of FIG. 5, vent Nos. 22-28 were of the configuration of FIG. 6 and vent No. 32 was of the configuration of FIG. 7. The data shows that as the head length (Head Dim. D) increased, the flow decreased, and as the radial clearance (gap 18) increased, the flow increased. Further, the introduction of the expansion diffuser and reduced body diameter greatly increased flow. Since the flow rate of the prior art vent plug (70) (Vent No. 32) was far below the rest and its larger size design flow of 800 cc/min or better, it is concluded that long body paths relative to bore diameter substantially raise friction and decrease flow as do long head lengths and grooves. Most importantly, all these parameters must be considered together since they are additive. However, only one of them, if a severe condition, is needed to cause a bottle neck negating any good done by all the others. Thus it is the labyrinth of the flow path that must be considered. In addition, flow alone is not the answer, rubber penetration is just as important. Testing continues on rubber penetration, the above data is limited to fluid flow only.

While the vent plugs illustrated herein have been described with round heads and bodies it will be appreciated that other configurations and shapes could be used where they match the bore in the mold to thereby form a peripheral gap between the vent plug head and the mold into which it is inserted. Even further, it is envisioned that any vent plug head could be further supported by contact between it and the mold as by for example a rib extending between the head and the mold. Thus it is further anticipated that the peripheral gap between the plug head and the mold need not be continuous all around the head.

In accordance with the provisions with the patent statutes, the principal and mode of opration of the device have been explained and what is considered to represent its best embodiment has been illustrated and described. It should, however, be understood that the invention may be practiced otherwise than as specifically illustrated and described without departing from its spirit and scope.

I claim:

1. A mold defining a cavity having walls surrounding the cavity and venting apparatus in a bore in the walls between the cavity and the outside atmosphere, comprising: a vent plug with a head of lateral area less than the area of the bore forming the opening to receive the plug which plug is located adjacent the cavity, the head defining a gap, between said head and said walls defining said bore, of generally annular form and generally uninterrupted; a plug portion having an indented annulus adjacent said head; an engaging portion for engaging the walls defining said bore; a body portion for guiding said plug into the bore and means for passing fluid past the engaging portion from the mold cavity, the passages formed by the gap, forming a labyrinth with the indented annulus and said means for passing fluid.

2. The vent plug defined in claim 1 wherein said engaging portion is located adjacent the indented annulus.

3. The vent plug defined in claims 1 or 2 wherein said head portion has a circular cross section.

4. The vent plug defined in claims 1 or 2 wherein said head portion has a contoured face.

5. The vent plug defined in claims 1 or 2 wherein said engaging portion includes an extended collar for engaging the bore in the mold.

6. The vent plug defined in claim 5 wherein said means for passing fluid and providing a labyrinth include walls in the collar forming grooves for passage of fluid past the collar.

7. The vent plug defined in claims 1 or 2 wherein said body portion has a smaller diameter than the head.

8. The vent plug defined in claim 7 wherein the indented annulus is adjacent the head.

9. The vent plug defined in claim 7 wherein said means for passing fluid includes said body portion having walls forming a vent hole extending longitudinally of the vent plug and said indented annulus portion having walls forming a cross vent hole to fluidly interconnect with the part of the mold bore below the vent plug.

10. The vent plug defined in claim 7 wherein said means for passing fluid includes said body portion and engaging portion having walls forming flutes longitudinally of the vent plug to fluidly interconnect with the part of the mold bore below the vent plug.

11. The vent plug defined in claim 7 wherein said indented annulas is concentric with the vent plug.

12. The vent plug defined in claim 11 wherein said plug has a lower portion below the groove for engagement with the mold.

13. The vent plug defined in claim 11 wherein said engaging portion has a peripheral face for engagement with the mold.

14. The vent plug defined in claims 1 or 2-13 wherein the head length of the vent plug is between 0.050" and 0.010".

15. The vent plug defined in claims 1 or 2-13 wherein the head length of the vent plug is between 0.050" and 0.010", the collar length is between 0.25" and 0.50", the plug length is approximately one half inch long, the body portion diameter is less than that of the head and the collar has grooves for fluid passage with an area greater than the annulus around the head.

16. The vent plug defined in claim 15 wherein the head includes an expansion diffusion contour adjacent the annular portion and opposite the cavity.

* * * * *